United States Patent
Campbell

(10) Patent No.: US 10,071,778 B2
(45) Date of Patent: Sep. 11, 2018

(54) TORQUE STICK APPARATUS AND METHODS OF USE

(71) Applicant: Sierra Extreme, Folsom, CA (US)

(72) Inventor: Dean Edward Campbell, Folsom, CA (US)

(73) Assignee: Sierra Extreme, Folsom, CA (US)

( * ) Notice: Subject to any disclaimer, the term of this patent is extended or adjusted under 35 U.S.C. 154(b) by 0 days.

(21) Appl. No.: 15/279,330

(22) Filed: Sep. 28, 2016

(65) Prior Publication Data

US 2017/0190365 A1    Jul. 6, 2017

Related U.S. Application Data

(60) Provisional application No. 62/274,146, filed on Dec. 31, 2015.

(51) Int. Cl.

| | |
|---|---|
| *A63C 5/08* | (2006.01) |
| *B62D 51/02* | (2006.01) |
| *B60L 7/12* | (2006.01) |
| *B60L 11/18* | (2006.01) |
| *B60L 11/00* | (2006.01) |
| *B60L 15/30* | (2006.01) |
| *B60L 15/20* | (2006.01) |
| *A63C 17/12* | (2006.01) |
| *B62M 6/50* | (2010.01) |
| *B60L 13/10* | (2006.01) |
| *B60V 1/14* | (2006.01) |

(52) U.S. Cl.
CPC ............... *B62D 51/02* (2013.01); *B60L 7/12* (2013.01); *B60L 11/007* (2013.01); *B60L 11/1805* (2013.01); *B60L 11/1818* (2013.01); *B60L 11/1866* (2013.01); *B60L 11/1877* (2013.01); *B60L 15/2009* (2013.01); *B60L 15/30* (2013.01); *A63C 17/12* (2013.01); *B60L 13/10* (2013.01); *B60L 2200/24* (2013.01); *B60L 2200/46* (2013.01); *B60L 2220/16* (2013.01); *B60L 2220/46* (2013.01); *B60L 2230/12* (2013.01); *B60L 2240/421* (2013.01); *B60L 2240/461* (2013.01); *B60V 1/14* (2013.01); *B60Y 2200/91* (2013.01); *B60Y 2300/91* (2013.01); *B60Y 2400/112* (2013.01); *B60Y 2400/602* (2013.01); *B62M 6/50* (2013.01)

(58) Field of Classification Search
CPC ..... A63C 11/10; A63C 17/12; A63C 17/0013; A63C 11/06; A63C 5/08; B62D 51/02; B60L 7/12; B60L 11/007; B60L 11/1805
See application file for complete search history.

(56) References Cited

U.S. PATENT DOCUMENTS

| | | | | |
|---|---|---|---|---|
| 3,193,038 A | * | 7/1965 | Cronkright | ............ A63C 11/10 180/10 |
| 3,791,469 A | * | 2/1974 | Prosser | ................. B61B 11/006 180/180 |

(Continued)

*Primary Examiner* — Hau Van Phan
(74) *Attorney, Agent, or Firm* — Davis & Associates; William D. Davis

(57) ABSTRACT

A method of operating a personal transporter includes mounting the personal transporter. A torque stick apparatus having a rotating wheel is provided. The wheel of the torque stick apparatus is positioned against a drive surface to drive the personal transporter across a transport surface.

20 Claims, 6 Drawing Sheets

(56) References Cited

U.S. PATENT DOCUMENTS

| | | | | |
|---|---|---|---|---|
| 4,456,089 A * | 6/1984 | Kuwahara | ........... | A63C 17/0013 |
| | | | | 180/180 |
| 5,127,488 A * | 7/1992 | Shanahan | ............... | A63C 17/12 |
| | | | | 180/11 |
| 5,385,210 A * | 1/1995 | Harvey | ................... | A63C 11/10 |
| | | | | 180/11 |
| 5,562,176 A * | 10/1996 | Lucernoni | ............... | A63C 17/12 |
| | | | | 180/180 |
| 5,973,618 A * | 10/1999 | Ellis | ....................... | A61H 3/061 |
| | | | | 135/75 |
| 6,467,559 B1 * | 10/2002 | Farrell | .................... | A63C 11/10 |
| | | | | 180/180 |
| 6,640,919 B1 * | 11/2003 | Towler | ................... | A63C 17/12 |
| | | | | 180/180 |
| 8,418,705 B2 * | 4/2013 | Ota | .......................... | A61H 3/04 |
| | | | | 135/71 |
| 2006/0070646 A1 * | 4/2006 | Denman | ................... | A45B 3/00 |
| | | | | 135/66 |

* cited by examiner

TORQUE STICK APPARATUS AND METHODS OF USE

CROSS-REFERENCE TO RELATED APPLICATION

This application claims the benefit of provisional application No. 62/274,146 filed on Dec. 31, 2015.

TECHNICAL FIELD

This invention relates to the field of personal transport. In particular, this invention is drawn to an apparatus to generate a drive torque for driving commuting and sport and leisure personal transport apparatus such as skates, roller blades, skateboards, hoverboards, and scooters.

BACKGROUND

Personal transporter apparatus such as skates, roller blades, skateboards, hoverboards, and scooters are frequently associated with sport and leisure activities. Such personal transporter apparatus are also used for travel to and from school or a place of employment. These personal transporters typically rely on the rider or user to generate the drive force needed to move the personal transporter and rider.

One disadvantage of personal transport apparatus powered solely by the user is that use of the personal transporter is discouraged by longer distance trips, terrain with slopes, and terrain that might be easy to traverse in one direction but is materially more difficult to traverse in the other direction due to slope.

One approach for assisting the user is to integrate a motor and power system into the personal transporter to assist or provide the drive force. Such integration tends to significantly alter the form factor, increase the cost, and impose additional constraints on the maintenance and care of the apparatus. Motorization may not even be feasible for some personal transport apparatus due to the form factor (size) of the apparatus (e.g., skates).

SUMMARY

A method of operating a personal transporter includes the user mounting the personal transporter. A torque stick apparatus having a rotating wheel is provided. The wheel of the torque stick apparatus is applied against a drive surface to drive the personal transporter across a transport surface.

In one embodiment the torque stick apparatus includes a housing, a battery pack, a throttle, and a motor coupled to the wheel. A motor controller coupled to the motor, battery pack and throttle control supplies power from the battery pack to the motor in accordance with the throttle control. The battery pack, motor controller, and motor are contained within the housing.

In one embodiment a torque stick apparatus includes a housing, throttle control, brake control, battery pack, wheel, and a motor coupled to the wheel. The apparatus includes a motor controller coupled to transfer power between the motor and battery pack. The motor controller is coupled to receive control signals from the throttle control and brake control. The motor controller supplies power from the battery pack to the motor in accordance with the throttle control when the brake control is not asserted. The motor controller supplies power generated by the motor to the battery pack when the brake control is asserted. The battery pack, motor controller, and motor are contained within the housing.

In various embodiments the personal transporter may be any of wheeled or wheel-free personal transporters including skates, roller blades, skateboards, hoverboards, and scooters.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
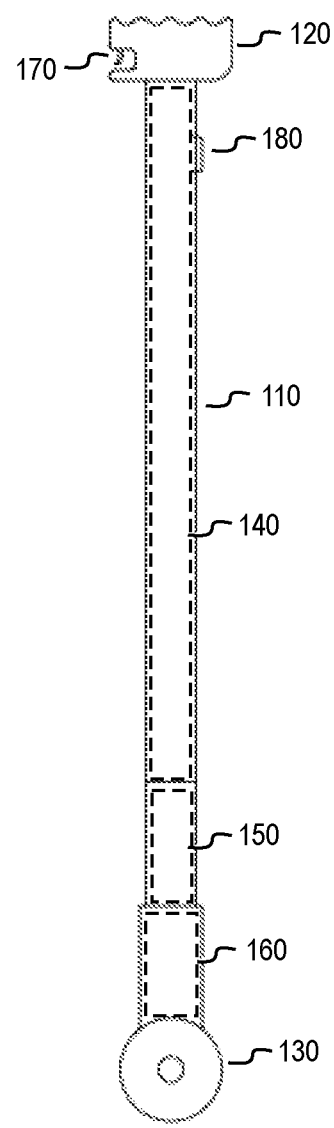
FIG. 1 illustrates one embodiment of a torque stick apparatus.

FIG. 1 illustrates one embodiment of an apparatus ("torque stick") for applying a drive force at a distance from a user of a personal transporter apparatus. The apparatus 100 includes a housing 110, a handle 120, and a wheel 130.

The housing 110 is hollowed to enable carrying a battery pack 140, motor controller 150, and motor 160 and any transmission (not shown) for coupling the motor to the wheel. In the illustrated embodiment the motor is coupled to the wheel by a transmission device such as a gear box (not shown). In alternative embodiments, the motor is connected directly to the wheel (i.e., direct drive). In various embodiments, the housing is of sufficient length to provide distance in the range of 1 foot to 5 feet between the closest distance between the periphery of the wheel and the bottom of the handle. In one embodiment, the length of the housing is adjustable. The housing, for example, may be constructed of telescoping sections to enable varying the length of the housing. In various embodiments, the housing is substantially tubular with a circular or polygonal cross-section.

In the illustrated embodiment, a throttle control 170 is located near the handle. In alternative embodiments, the throttle control may be located elsewhere on the housing or wholly apart from the housing (i.e., the throttle control may be coupled wirelessly to the torque stick apparatus).

A charging port 180 is provided to allow for charging the battery pack. The charging port allows coupling of the battery pack through a charge controller (not shown in FIG. 1) to an external power source via the charging port. In one embodiment, the charge controller is located within the housing. In alternative embodiments, the charge control is managed by a charge controller located external to the torque stick.

The throttle control, battery pack, motor controller, and motor are electrically coupled to permit the throttle control to control the rotational speed or velocity of the motor (and therefore the wheel). In one embodiment, the torque stick apparatus includes a brake control (not illustrated in FIG. 1) electrically coupled to the motor controller. A brake control independent from the throttle control enables the user to affirmatively signal the motor controller to slow or stop the motor irrespective of the throttle control.

Figure 2:
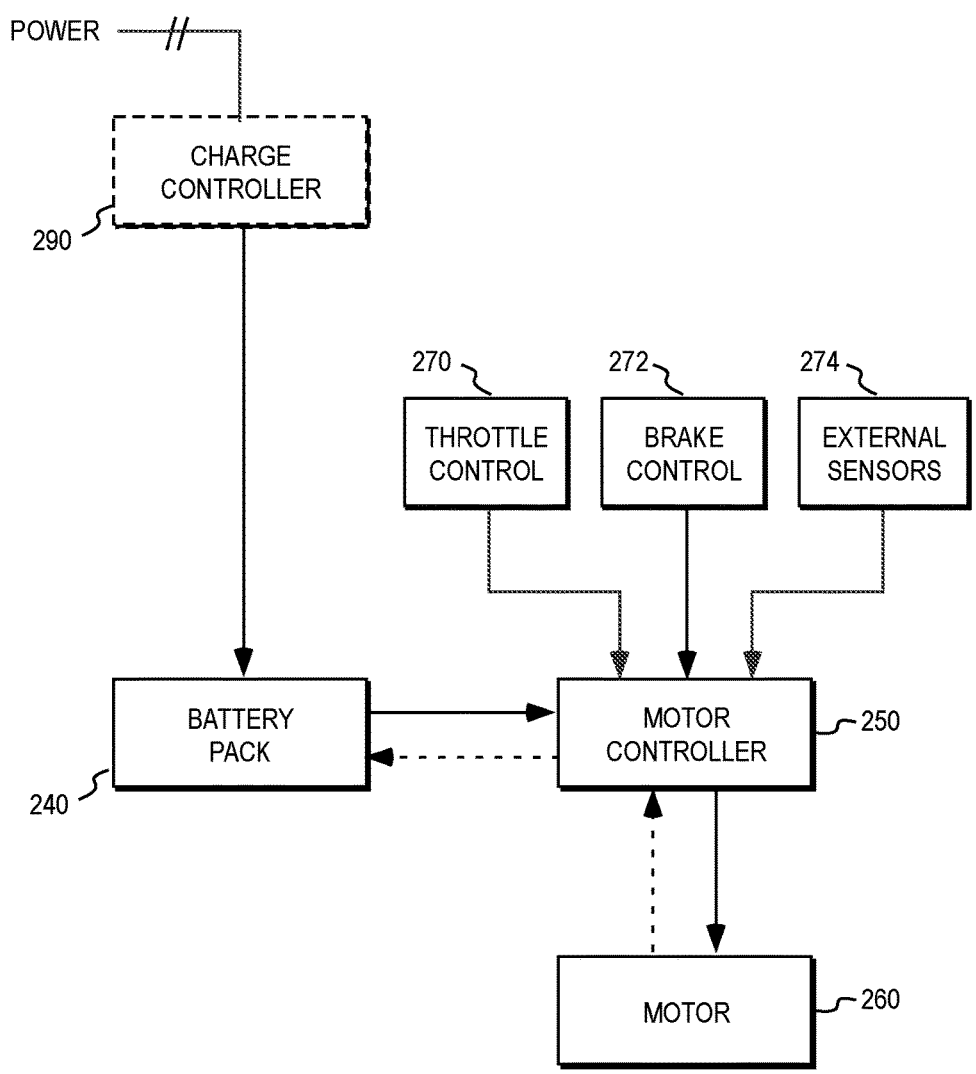
FIG. 2 illustrates one embodiment of a functional block diagram for a torque stick apparatus.

FIG. 2 illustrates one embodiment of a functional electrical block diagram 200 of the torque stick apparatus. The arrows indicate the flow of control, power, or both during normal operation of the torque stick. The dotted line arrows are applicable to operation in a braking or regeneration mode which is discussed in greater detail below. Motor controller 250 receives power from battery pack 240 and control from throttle control 270. Motor controller 250 applies power to motor 260 from the battery pack in accordance with the throttle control. Charge controller 290 regulates the charging of the battery pack from an external power source. Although the charge controller is required for charging the battery back, the charge controller is identified with dotted lines because it only needs to be operational when the battery pack is being charged.

In one embodiment motor 260 is a brushless dc motor. Commutation is handled electronically by the motor controller. In one embodiment, the motor controller may sense the back electromotive force ("back EMF") generated by the motor in order to manage commutation (see, e.g., dotted lines from motor 260 to motor controller 250). In other embodiments the motor is an induction motor or variable reluctance motor.

In one embodiment the torque stick apparatus incorporates regenerative braking. Reducing application of power to the motor reduces the motor drive, however, reducing motor drive does not impart a braking effect to the wheel. In a regenerative braking mode the motor effectively operates as a generator to produce electricity. Instead of providing power and controlling commutation, the motor controller feeds the generated electricity from the motor back to the battery pack 240. The battery pack serves as an electrical load for the motor when the motor is operated as a generator. The loading creates a braking effect because the motor resists rotation when it is operated as a generator with an electrical load. For direct drive wheels (or wheels coupled by a non-free spinning or non-overdrive transmission) the wheel will likewise resist rotation. The torque stick apparatus will operate to brake the personal transporter when the motor is in regenerative braking mode and the wheel of the torque stick apparatus is applied to the drive surface.

The motor controller controls the flow of electricity between the motor and the battery pack. When the motor controller determines the motor is being driven faster than desired by the user based on control inputs, sensed data, or some combination of these, the motor controller switches to regenerative braking mode and supplies electricity generated by the motor to the battery pack. Regenerative braking can thus deliver electricity for charging the battery pack while braking.

Although in one embodiment the position of the throttle control may be used in conjunction with a sensed or estimated rotational velocity of the wheel to determine whether the wheel has exceeded the desired rotational velocity, in an alternative embodiment a separate brake control 272 is provided for the user to affirmatively apply braking. In this latter embodiment assertion of the brake control overrides the throttle control.

In one embodiment, one or more external sensors 274 may be utilized to provide data needed by the motor controller to determine whether to enter into regenerative braking mode or for controlling commutation during normal mode (i.e., non-regenerative braking mode) of operation. In one embodiment, one external sensor is a wheel speed sensor which provides a signal corresponding to a rotational speed of the wheel of the torque stick apparatus. In another embodiment, one external sensor includes an accelerometer to assist in determining the speed of movement of the torque stick apparatus (or personal transporter) relative to the transport surface.

Figure 3:
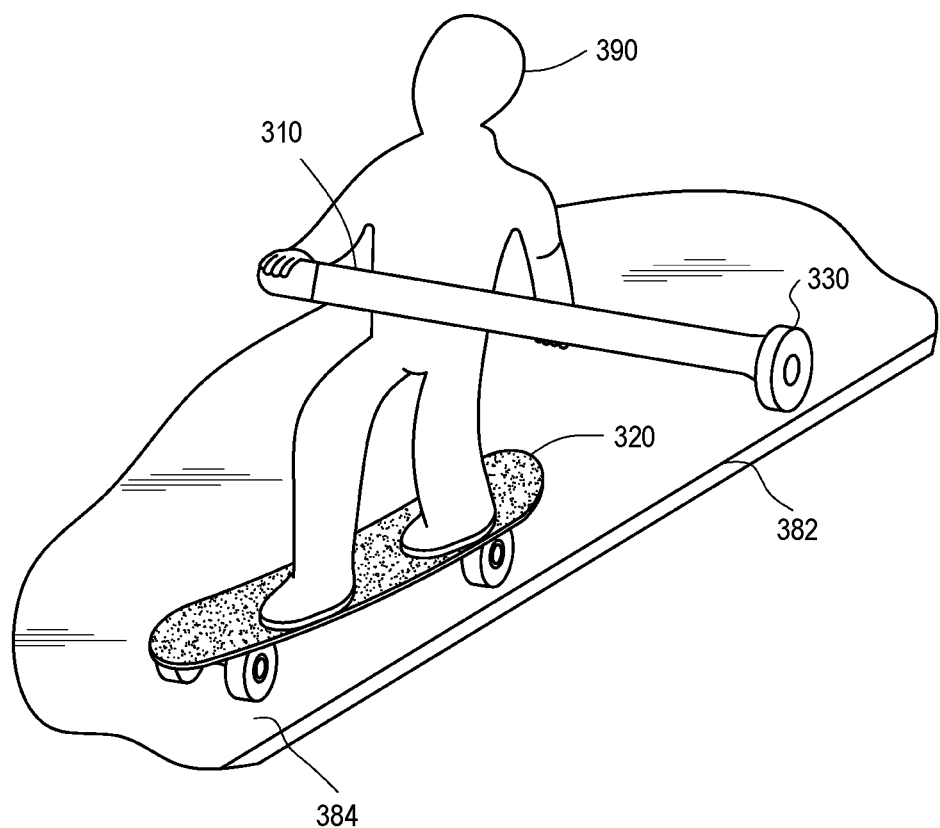
FIG. 3 illustrates one embodiment of a method of using the torque stick apparatus for personal transporter propulsion or locomotion.

FIG. 3 illustrates one embodiment of a method of using the torque stick apparatus for personal transporter propulsion or locomotion. In this embodiment, the personal transporter 320 is a skateboard. The user grips the handle of the torque stick 310 to control positioning and throttle. The user actuates the throttle of the torque stick to drive the torque stick wheel. After the user 390 has mounted the personal transporter, the torque stick wheel 330 is placed in contact with the drive surface 382 (roadway, sidewalk, curb, etc.) to provide a drive force to drive the skateboard across the transport surface 384. The drive surface and transport surface may be the same or distinct surfaces or structures. The term "mount" refers to getting onto the personal transporter (e.g., skateboard) or putting on the personal transporter (e.g., skates) in preparation for use of the personal transporter for transport.

Figure 4:
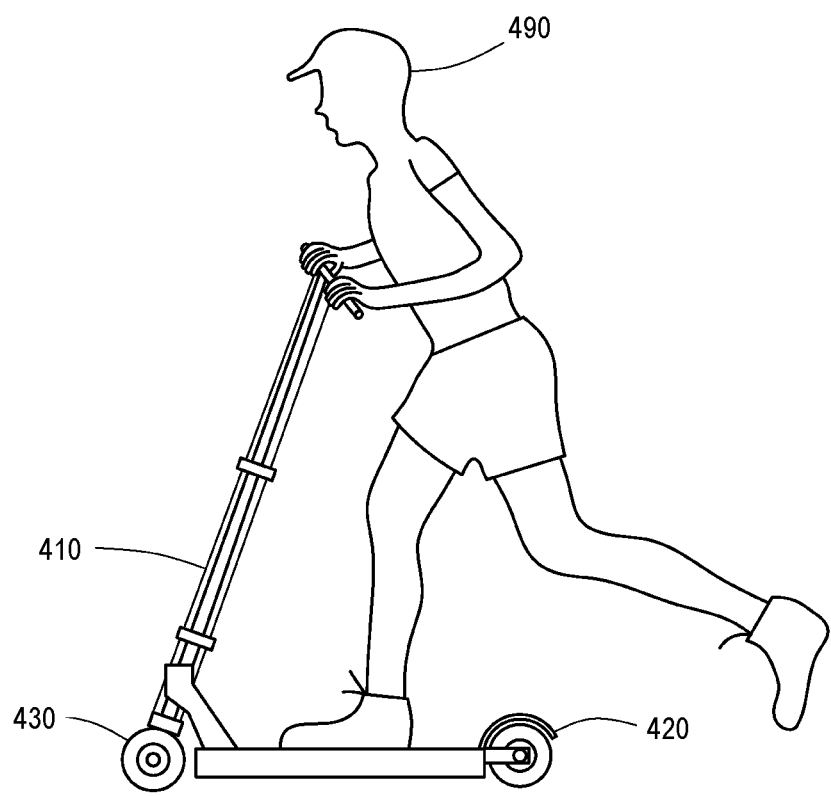
FIG. 4 illustrates another embodiment of a method of using the torque stick apparatus for personal transporter propulsion or locomotion.

FIG. 4 illustrates one embodiment of a method of using the torque stick apparatus for personal transporter propulsion or locomotion. In this embodiment, the personal transporter 420 is a two-wheeled scooter. In this embodiment the torque stick 410 replaces the traditional scooter handle. The user 490 grips the handle of the torque stick to control steering and in some embodiments the throttle control. The user actuates the throttle control to drive the wheel 430 which also serves as one of the scooter wheels. When in contact with the drive surface (roadway, sidewalk, etc.), the torque stick wheel provides a drive force for the scooter to move the scooter across the transport surface. The drive surface and transport surface are the same in this application. Although integrated into the scooter, in this embodiment the torque stick does not materially alter the form factor of a traditional scooter.

Figure 5:
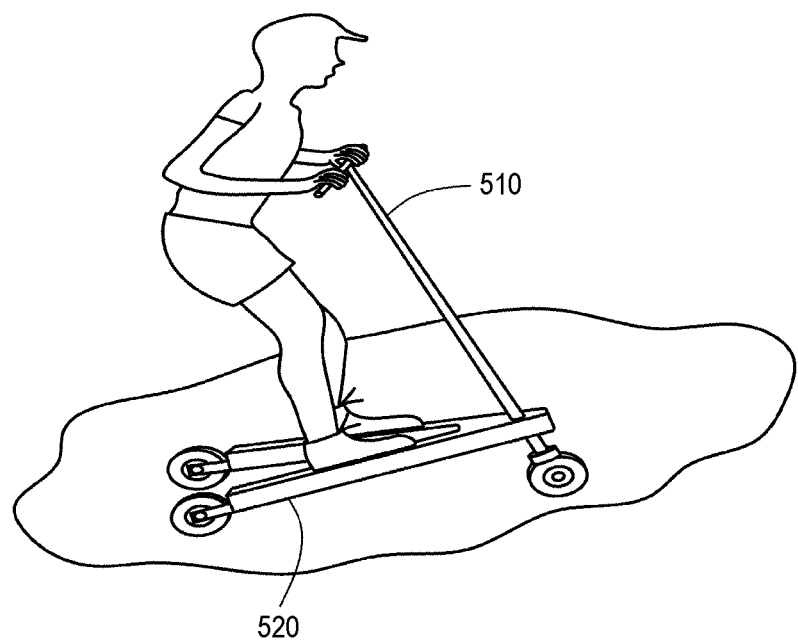
FIG. 5 illustrates another embodiment of a method of using the torque stick apparatus for personal transporter propulsion or locomotion.

FIG. 5 illustrates another embodiment of a method of using the torque stick apparatus for personal transporter propulsion or locomotion. In this embodiment, the personal transporter 520 is a three-wheeled scooter. In this embodiment the torque stick 510 replaces the traditional scooter handle. Aside from the use of a different personal transporter, the integration of the torque stick into the personal transporter and the method of using the torque stick are the same as discussed with respect to FIG. 4.

Figure 6:
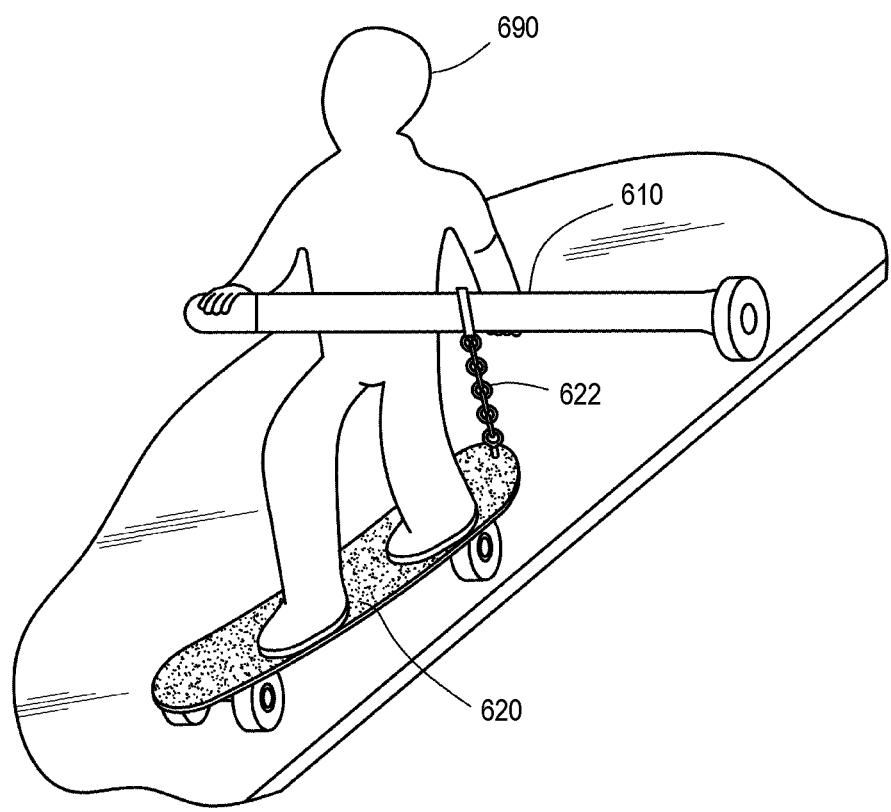
FIG. 6 illustrates another embodiment of a method of using the torque stick apparatus for personal transporter propulsion or locomotion.

FIG. 6 illustrates another embodiment of a method of using the torque stick apparatus for personal transporter propulsion or locomotion. In this embodiment, the personal transporter 620 is a skateboard. In this embodiment, a support coupler 622 is provided to more closely couple the wheel and forces generated by the torque stick 610 to the skateboard. The support coupler can improve the efficiency of propulsion/locomotion but also functions in whole or part to offload the forces the user 690 would otherwise experience in the user's arm, wrist, and hand from holding the torque stick. The user actuates the throttle of the torque stick to drive the wheel. After the user has mounted the personal transporter, the torque stick wheel is placed in contact with the drive surface (e.g., roadway, sidewalk, etc.) to provide a drive force to drive the skateboard across the transport surface.

When hand-held, the torque stick apparatus need not be maintained in contact with the transport surface at all times. The torque stick need only be placed in contact with the drive surface when a drive force is desired. Intermittent application of the torque stick wheel to the drive surface may be employed to reduce undesirable rolling resistance drag forces that might otherwise be present with continuous contact.

In some cases the user may wish to utilize the drag forces that can be generated by the torque stick to assist in braking (decelerating) the personal transporter. The user may also be able to take advantage of longer sloping terrains to re-generate (re-charge) the battery pack. In one embodiment, the motor controller is adapted to support a regeneration mode where the motor is operated in a generator mode to regenerate charge for the battery pack. The torque stick will also provide greater drag when the motor is operated in a generator mode. With reference to FIG. 2, the dotted line arrows indicate the flow of power, control, or both when the torque stick is operating in a regeneration or braking mode.

The drive surface used by the torque stick may be but need not be the same as the transport surface the personal transporter is transported over. In FIG. 4 above, the drive and transport surfaces are inherently the same because the wheel of the torque stick doubles as one of the scooter wheels. However, the user of FIG. 3 can utilize the transport surface (e.g., roadway, sidewalk, etc.) as the drive surface or alternatively the user can use other nearby structures (e.g., curb, structures within reach of the torque stick) for the drive surface.

The methods illustrated above may be similarly used for propulsion or locomotion of other wheeled or wheel-free personal transporters including skates, roller blades, skateboards, hoverboards, hovercraft, and scooters. Skates and roller blades are multi-wheeled personal transporters the user wears like a shoe or over a shoe. Skates and roller blades are worn in pairs—one skate (or roller blade) on each foot. Skateboards are wheeled personal transporters that the user stands on. Scooters are wheeled personal transporters that the user stands on but may be differentiated from skateboards in that scooters have a handle coupled to the platform the user is standing on to provide stability. The handle is also typically coupled to a wheel to enable steering. A hovercraft is a wheel-free personal transporter supported by a cushion of air during operation. The use of the torque stick apparatus with a hovercraft or a magnetically suspended hoverboard may improve maneuverability and use time between charges or fueling for the hovercraft or magnetically suspended hoverboard.

The battery pack may comprise one or more batteries. Although lead acid batteries may be used, other materials offer greater energy density, lighter weight, better discharge rates, and faster recharge time. In various embodiments, for example, the battery pack is constructed of nickel metal hydride, lithium ion, or lithium polymer ion batteries.

In an alternative embodiment, the torque stick apparatus relies upon a chemical fuel-based combustion engine instead of a motor, one or more fuel reservoirs instead of batteries, and a throttle that throttles the provision of fuel to an engine rather than electricity to a motor. Thus, with respect to FIG. 1 for example, an engine-based embodiment utilizes a fuel-powered combustion engine 160, a fuel tank 140, and a fuel throttle control 170. The item identified as motor controller 150 is not needed for commutation in the engine-based embodiment, however, an electronic controller may be employed for regulating power output of the engine and transmission (if a transmission is used) based upon throttle control, brake control, and any sensed data.

In the preceding detailed description, the invention and methods of use are described with reference to specific exemplary embodiments thereof. A torque stick apparatus and methods of use have been described. Various modifications and changes may be made thereto without departing from the broader scope of the invention as set forth in the claims. The specification and drawings are, accordingly, to be regarded in an illustrative rather than a restrictive sense.

What is claimed is:

1. A method of operating a personal transporter:
   mounting the personal transporter;
   providing a torque stick apparatus having a rotating wheel, wherein the torque stick apparatus comprises a tubular housing, a user-actuated throttle control, a battery pack, a motor coupled to the wheel, and a motor controller coupled to the motor, the battery pack, and the user-actuated throttle control, wherein the motor controller supplies power from the battery pack to the motor in accordance with the user-actuated throttle control, wherein the battery pack, the motor controller, and the motor are contained within the housing; and
   applying the wheel of the torque stick apparatus against a drive surface to drive the personal transporter across a transport surface.

2. The method of claim 1 wherein the personal transporter is any one of the following: skates, roller blades, skateboard, magnetically suspended hoverboard, hovercraft, scooter.

3. The method of claim 1 wherein the personal transporter is wheel-free.

4. The method of claim 1 wherein the personal transporter is multi-wheeled.

5. The torque stick apparatus of claim 1 wherein the motor is a one of a dc motor, an induction motor, and a variable reluctance motor.

6. The torque stick apparatus of claim 1 wherein the motor is a brushless dc motor.

7. The torque stick apparatus of claim 1 wherein the motor controller supplies power from the motor to the battery back when the motor controller is in a regenerative braking mode.

8. The torque stick apparatus of claim 7 further comprising a brake control coupled to the motor controller, wherein the motor controller enters into the regenerative braking mode when the brake control is asserted.

9. The torque stick apparatus of claim 1 wherein the motor and the wheel have a same rotational speed.

10. A torque stick apparatus comprising:
    a tubular housing;
    a user-actuated throttle control;
    a battery pack;
    a wheel;
    a motor coupled to the wheel; and
    a motor controller coupled to the motor, the battery pack and the user-actuated throttle control, wherein the motor controller determines whether to select regenerative braking mode based at least in part on the position of the user-actuated throttle control, wherein the motor controller supplies power from the battery pack to the motor in accordance with the user-actuated throttle control when regenerative braking mode is not selected, wherein the motor controller supplies power from the motor to the battery pack when regenerative braking mode is selected, wherein the battery pack, the motor controller, and the motor are contained within the housing.

11. The torque stick apparatus of claim 10 wherein the motor is a one of a dc motor, an induction motor, and a variable reluctance motor.

12. The torque stick apparatus of claim 11 wherein the motor is a brushless dc motor.

13. The torque stick apparatus of claim 10 wherein the motor and the wheel have a same rotational speed.

14. The torque stick apparatus of claim 10 wherein the tubular housing has at least one of a circular and a polygonal cross section.

15. The torque stick apparatus of claim 10 wherein the housing has telescoping sections to enable varying a length of the housing.

16. A torque stick apparatus comprising:
a tubular housing;
a user-actuated throttle control;
a user-actuated brake control;
a battery pack;
a wheel;
a motor coupled to the wheel; and
a motor controller coupled to transfer power between the motor and the battery pack, wherein the motor controller is coupled to receive control signals from the user-actuated throttle control and the user-actuated brake control, wherein the motor controller supplies power from the battery pack to the motor in accordance with the user-actuated throttle control when the user-actuated brake control is not asserted, wherein the motor controller supplies power generated by the motor to the battery pack when the user-actuated brake control is asserted, wherein the battery pack, the motor controller, and the motor are contained within the housing.

17. The torque stick apparatus of claim 16 wherein the motor is a one of a dc motor, an induction motor, and a variable reluctance motor.

18. The torque stick apparatus of claim 17 wherein the motor is a brushless dc motor.

19. The torque stick apparatus of claim 16 wherein the tubular housing has at least one of a circular and a polygonal cross section.

20. The torque stick apparatus of claim 16 wherein the motor and the wheel have a same rotational speed.

* * * * *